(12) United States Patent
Tanaka (10) Patent No.: US 9,983,529 B1
(45) Date of Patent: May 29, 2018

(54) IMAGE FORMING APPARATUS AND PRINTING METHOD USING A NON-DECOLORABLE TONER AND DECOLORABLE TONER

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Toshihide Tanaka, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/464,645

(22) Filed: Mar. 21, 2017

(30) Foreign Application Priority Data

Feb. 15, 2017 (JP) .................................. 2017-026128

(51) Int. Cl.
*G03G 15/00* (2006.01)
*G06F 3/12* (2006.01)

(52) U.S. Cl.
CPC ........ *G03G 15/5016* (2013.01); *G06F 3/1219* (2013.01); *G06F 3/1253* (2013.01)

(58) Field of Classification Search
CPC .. G03G 15/5016; G06F 3/1253; G06F 3/1219
USPC .......................................................... 399/81
See application file for complete search history.

(56) References Cited

U.S. PATENT DOCUMENTS

2014/0248062 A1* 9/2014 Katayama .......... G03G 15/5062
                                                        399/28
2015/0277321 A1* 10/2015 Nonaka .................. G03G 15/50
                                                        399/82

FOREIGN PATENT DOCUMENTS

JP        1998-149060        6/1998

* cited by examiner

*Primary Examiner* — Billy Lactaoen
(74) *Attorney, Agent, or Firm* — Amin, Turocy & Watson LLP (57) ABSTRACT

In accordance with an embodiment, an image forming apparatus comprises a first printing unit configured to execute printing with non-decolorable first toner on an image receiving medium, a second printing unit configured to execute printing with decolorable second toner on the image receiving medium, and a control module configured to print an image according to image information on the image receiving medium with the first printing unit, and execute printing on a cover paper of the image receiving medium with the second printing unit.

6 Claims, 12 Drawing Sheets

| USER NAME | ********** |
| --- | --- |
| NUMBER OF PAGES | 10 |
| NUMBER OF COPIES | 1/10 |
| OUTPUT DATE AND TIME | 2017.3.3 15:30 |
| OUTPUT PAPER SIZE | A4 |

COVER PAPER

IMAGE FORMING APPARATUS AND PRINTING METHOD USING A NON-DECOLORABLE TONER AND DECOLORABLE TONER

CROSS-REFERENCE TO RELATED APPLICATIONS

This application is based upon and claims the benefit of priority from Japanese Patent Application No. 2017-026128, filed Feb. 15, 2017, the entire contents of which are incorporated herein by reference.

FIELD

Embodiments described herein relate generally to an image forming apparatus and a printing method.

BACKGROUND

There is an image forming apparatus such as a laser printer or a multifunction peripheral which is provided with a function of printing a cover paper separately together with a document cover and a drawing. This type of cover paper is used as a front cover positioned on a front surface of a printed matter and a back cover positioned on a back surface thereof.

However, in a case in which the number of print copies in the image forming apparatus is large, the front cover and the back cover are printed each time one printed matter is printed just to facilitate sorting of the printed matters. This type of the cover paper is generally disposed if the sorting of a plurality of the printed matters is terminated. There is also a case in which this type of cover paper is used as a so-called backing paper; however, since functions such as a duplex printing are restricted and appearance is deteriorated, it is a current situation that the effective use cannot be sufficiently utilized.

DETAILED DESCRIPTION

In accordance with an embodiment, an image forming apparatus comprises a first printing unit configured to execute printing with non-decolorable first toner on an image receiving medium, a second printing unit configured to execute printing with decolorable second toner on the image receiving medium, and a control module configured to print an image according to image information on the image receiving medium with the first printing unit, and execute printing on a cover paper of the image receiving medium with the second printing unit.

(First Embodiment)

Figure 1:
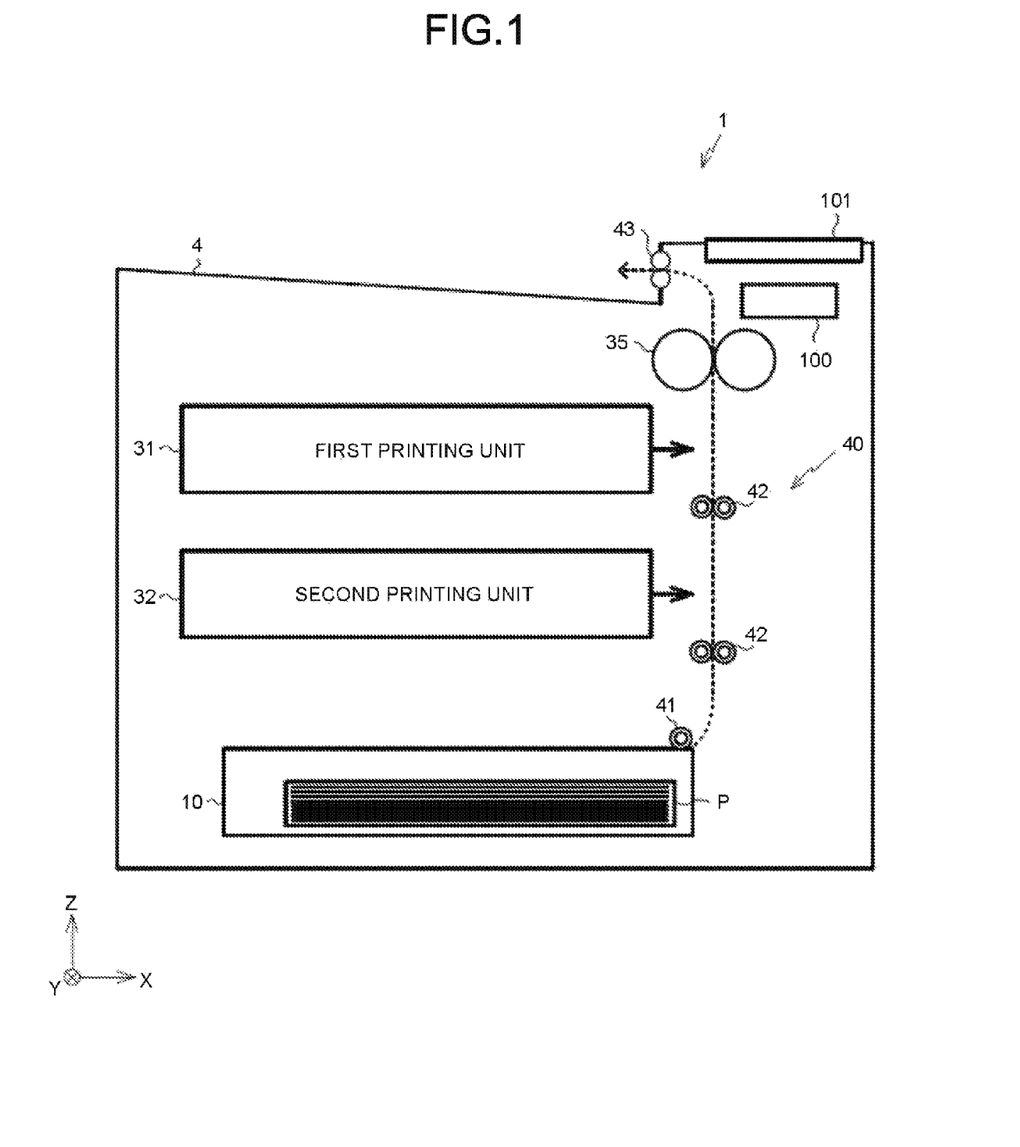
FIG. 1 is a diagram exemplifying the constitution of an image forming apparatus according to a first embodiment.

Hereinafter, the first embodiment of the present invention is described with reference to the accompanying drawings. FIG. 1 is a diagram exemplifying the constitution of an image forming apparatus 1 according to the present embodiment. The image forming apparatus 1 is, for example, a color laser printer using yellow toner, magenta toner, cyan toner and black toner. The image forming apparatus 1 includes a housing 4, a first printing unit 31, a second printing unit 32, a paper feed cassette 10, a fixing device 35, a control device 100 and an operation panel 101 that are housed in the housing 4.

The housing 4 is a rectangular parallelepiped casing made of resin, and a paper discharge section is formed on the upper surface thereof.

The first printing unit 31 includes four sets of image forming stations, a transfer belt and a laser exposure device. Each of the four image forming stations has a photoconductive drum, a charging device and a developing device. In each of the four image forming stations, a toner image respectively using the yellow toner, the magenta toner, the cyan toner and the black toner is formed on the photoconductive drum on which an electrostatic latent image is formed by the laser exposure device. The toner image formed on the photoconductive drum is transferred onto a paper P conveyed from the paper feed cassette 10 via the transfer belt. In the first printing unit 31, normal toner that is non-decolorable is used.

The second printing unit 32 is provided with a photoconductive drum, a laser exposure device and the like. In the second printing unit 32, a toner image is formed by decolorable toner on the photoconductive drum on which an electrostatic latent image is formed by the laser exposure device. The toner image formed on the photoconductive drum is transferred onto the paper P conveyed from the paper feed cassette 10. As the toner used in the second printing unit 32, a toner capable of developing color and decoloring is used. As this type of toner, for example, a toner containing a leuco dye having a thermal decoloring property is used.

The paper feed cassette 10 is detachably arranged with respect to the housing 4. The paper feed cassette 10 houses the paper P as the image receiving medium on which an image is formed.

The paper P housed in the paper feed cassette 10 is conveyed by a conveying system 40 composed of a pickup roller 41, a register roller 42 and a paper discharge roller 43. The paper P is drawn out from the paper feed cassette 10 by the pickup roller 41. The paper P drawn out from the paper feed cassette 10 is conveyed by the register roller 42 to the first printing unit 31 and the second printing unit 32. The paper P passes through the fixing device 35 and reaches the paper discharge roller 43. Then, the paper is discharged to the paper discharge section formed in the housing 4 by the paper discharge roller 43. At the time the paper P passes through the first printing unit 31 and the second printing unit 32, the toner image is transferred onto the paper P.

The fixing device 35 is composed of a pressure roller and a heating unit. The fixing device 35 heats and pressurizes the paper P onto which the toner image is transferred to fix the toner image on the paper P. The paper P on which the toner image is fixed is sequentially stacked on the paper discharge section of the housing 4 by the paper discharge roller 43.

The operation panel 101 is used to receive an instruction from a user. The operation panel 101 has, for example, a GUI (Graphical User Interface) composed of a liquid crystal display and a touch panel, various operation buttons and the like. The instruction from the user input to the operation panel 101 is notified to the control device 100.

The control device 100 includes a CPU (Central Processing Unit), a main storage section acting as a working area of the CPU, and an auxiliary storage section having a nonvolatile memory such as a magnetic disk or a semiconductor memory.

Figure 2:
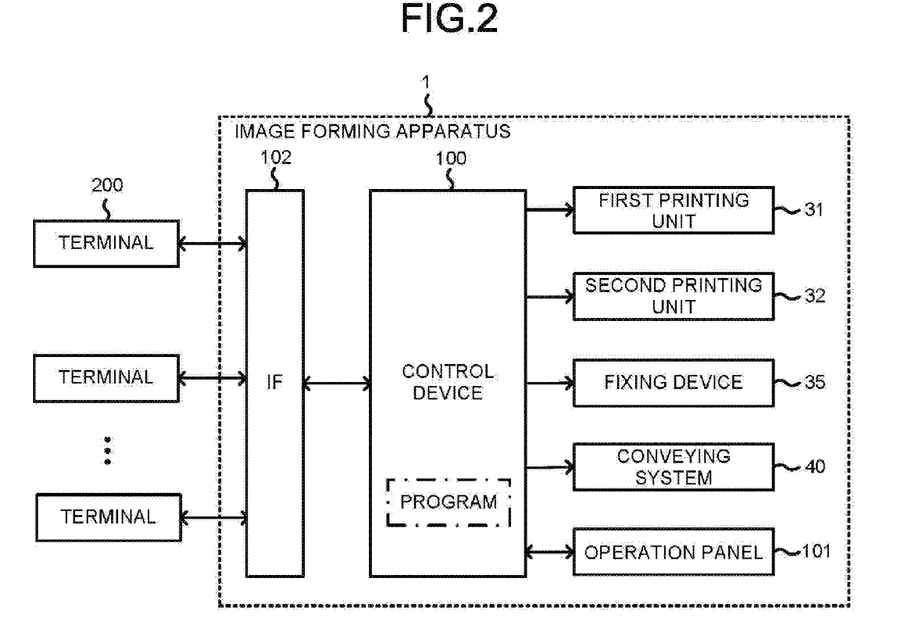
FIG. 2 is a block diagram illustrating a control system of the image forming apparatus.

FIG. 2 is a block diagram illustrating a control system of the image forming apparatus 1. As shown in FIG. 2, the first printing unit 31, the second printing unit 32, the fixing device 35, the conveying system 40, the operation panel 101 and the interface 102 are connected to the control device 100. Each section mentioned above is collectively controlled by the control device 100.

The interface 102 is, for example, a LAN interface, and the image forming apparatus 1 is connected to a network such as the Internet via the interface 102. As a result, communication with a terminal 200 such as a computer or a smartphone connected to the network is enabled.

Figure 3:
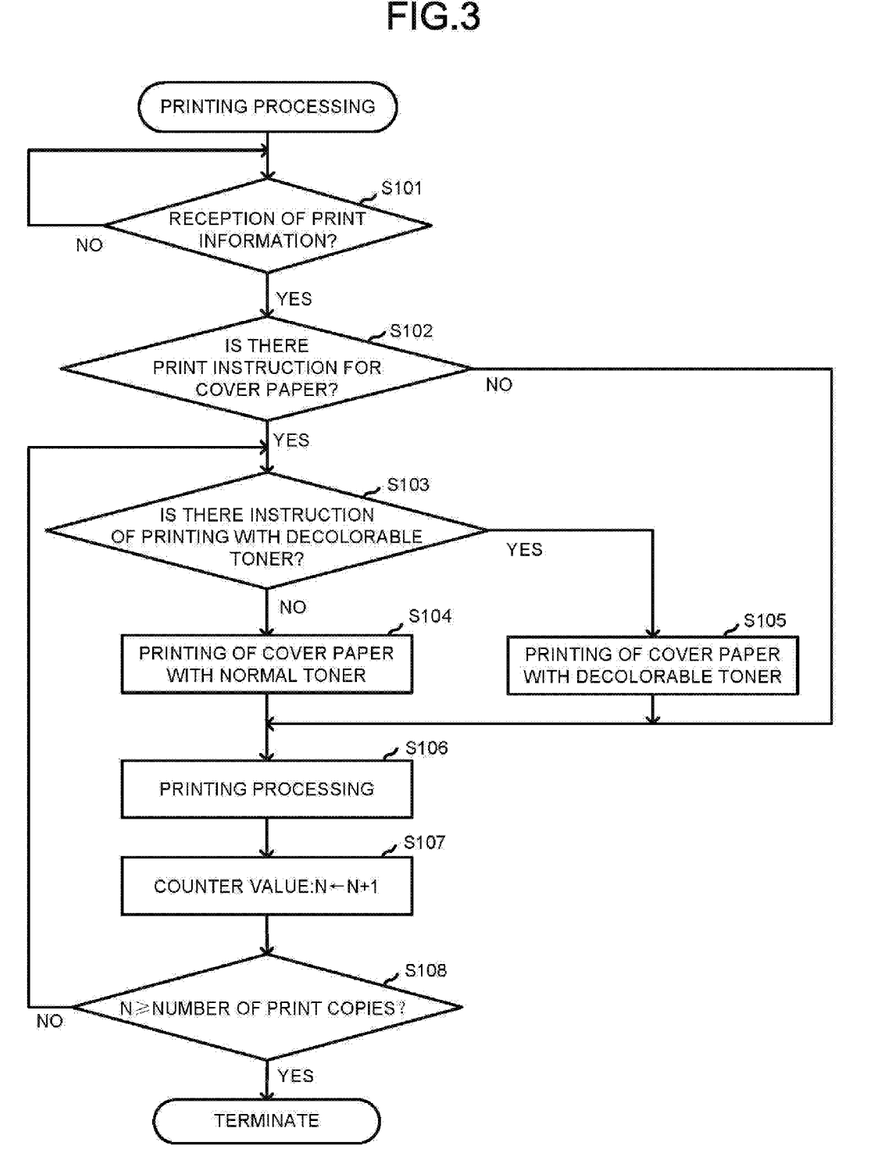
FIG. 3 is a flowchart illustrating a series of processing executed by a control device.

Next, the operation of the image forming apparatus 1 is described with reference to FIG. 3. The flowchart in FIG. 3 shows a series of processing executed by the control device 100. If a power source of the image forming apparatus 1 is turned on, the control device 100 sequentially executes the processing shown in the flowchart in accordance with a program installed in advance.

The control device 100 waits for reception of print information (Act S101). For example, the print information is transmitted from a terminal such as the terminal 200 connected to the image forming apparatus 1 via the network. The print information includes, for example, image information indicating a text or an image to be printed, information relating to the number of copies indicating the number of copies to be printed, cover paper information indicating whether or not a cover paper is added to a printed matter, and the like.

The information relating to the number of copies and the cover paper information included in the print information can be set via the terminal 200, for example. In the terminal 200, a driver for printing by using the image forming apparatus 1 is installed. In the terminal 200, at the time the image forming apparatus 1 executes the printing, an input screen for making various setting of the image forming apparatus 1 is displayed.

Figure 4:
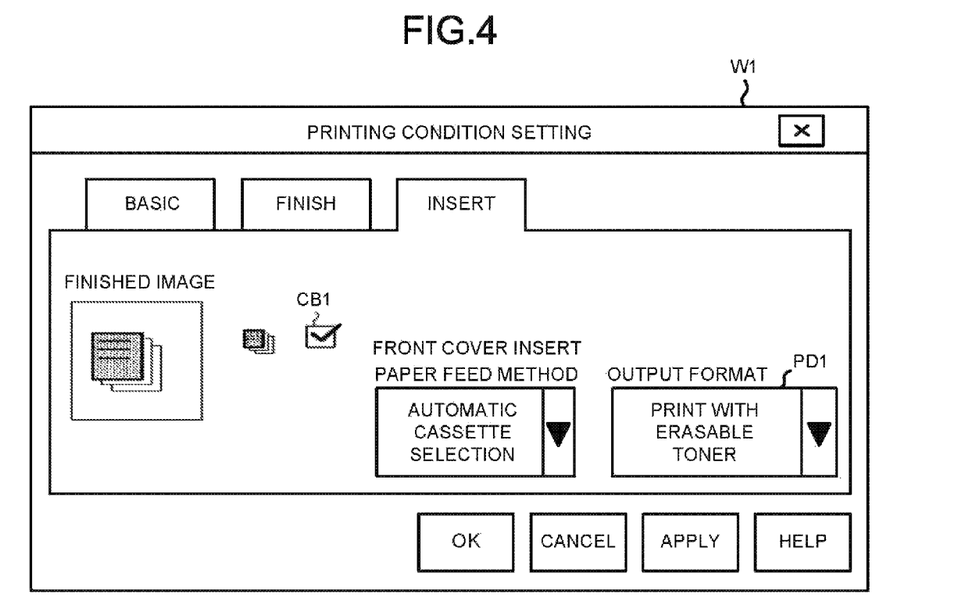
FIG. 4 is a diagram illustrating a window displayed on a terminal as an example.

FIG. 4 is a diagram illustrating a window W1 displayed on the terminal 200 as an example. The window W1 shown in FIG. 4 is an input screen for setting the cover paper added to the printed matter. The window W1 includes a check box CB1 for setting whether to add the cover paper (cover letter) to the printed matter, and a pull-down menu PD1 for setting the type of the toner for printing the cover paper.

By entering check to the check box CB1, the user can instruct the control device 100 to add the cover paper to the printed matter. By removing the check of the check box CB1, it is possible to instruct the control device 100 not to add the cover paper to the printed matter. The user can instruct the type of toner used for printing the cover paper to the control device 100 by selecting an item shown in the pull-down menu PD1. For example, the user can issue an instruction to print the cover paper with the decolorable toner by selecting an item "print with erasable toner" from the pull-down menu PD1.

If receiving the print information transmitted from the terminal 200 (Yes in Act S101), the control device 100 determines whether or not there is a print instruction for the cover paper (Act S102). On the basis of the cover paper information included in the print information, if it is determined that there is no print instruction for the cover paper (No in Act S102), the control device drives the first printing unit 31 and the conveyance system 40 to execute the printing on the paper P based on the image information without printing the cover paper (Act S106). For example, if the check is not entered to the check box CB1 of the window W1, it is determined that the print instruction for the cover paper is not given by the control device 100.

On the other hand, if it is determined that there is the print instruction for the cover paper based on the cover paper information included in the print information (Yes in Act S102), the control device 100 determines whether or not there is an instruction of the printing with the decolorable toner (Act S103). For example, if the check is entered to the check box CB1 of the window W1, it is determined by the control device 100 that there is the print instruction for the cover paper.

If it is determined that there is no instruction of the printing with the decolorable toner (No in Act S103), the control device 100 drives the first printing unit 31 and the conveyance system 40 to carry out the printing of the cover paper on the paper P (Act S104). The printing of the cover paper herein is carried out with the non-decolorable toner.

Figure 5:
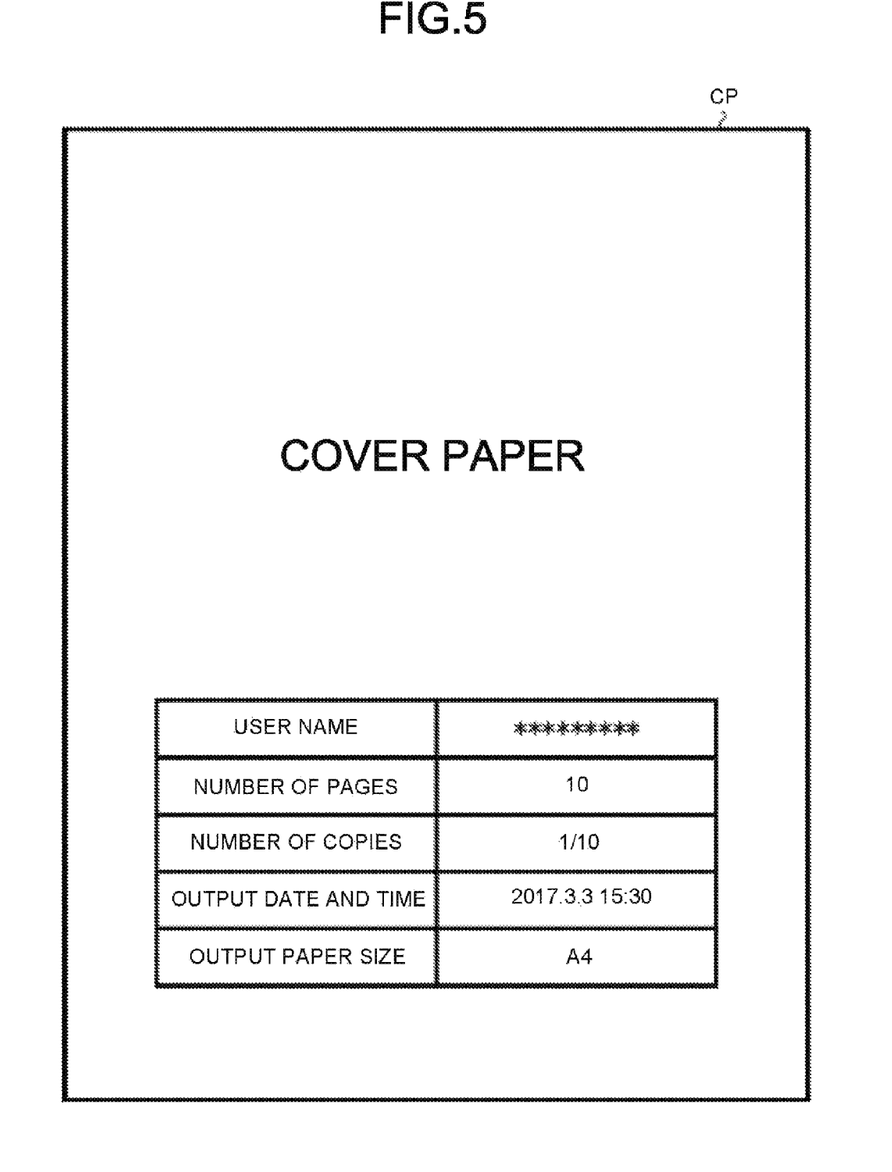
FIG. 5 is a diagram illustrating an example of a cover paper.

FIG. 5 is a diagram illustrating an example of a cover paper CP. As shown in FIG. 5, for example, a user name, a total number of pages of the printed matter, the number of print copies, an output date and time and a paper size for executing the printing are printed on the cover paper CP. Regarding the cover paper CP, a fixed form stored in the image forming apparatus 1 in advance may be printed, or the cover paper created by the user may be printed.

On the other hand, if it is determined that there is the instruction of the printing with the decolorable toner (Yes in Act S103), the control device 100 drives the second printing unit 32 and the conveying system 40 to execute the printing of the cover paper on the paper P (Act S105). The printing of the cover paper herein is carried out with the decolorable toner.

Following the printing of the cover paper, the control device 100 drives the first printing unit 31 and the conveying system 40 to carry out printing on the paper P based on the image information (Act S106). Thus, the printing of the printed matter to which the cover paper is added is completed.

Next, the control device 100 adds 1 to a counter value N of a counter built in the control device 100 (Act S107). The control device 100 compares the instructed number of the printed matters with the counter value N (Act S108). As described above, the print information includes the information relating to the number of copies. The control device 100 calculates the number of copies to be printed based on the information relating to the number of copies, and compares the obtained number with the counter value N. If it is determined that the counter value N is equal to or greater than the number of print copies (Yes in Act S108), the counter value N is initialized and the printing processing is terminated. Thus, the printing of an original document such as a document is completed.

If it is determined that the counter value N is not equal to or greater than the number of print copies (No in Act S108), the processing in Act S103~Act S108 is repeatedly executed. As a result, only a designated number of the printed matters to which the cover papers are added are printed.

As described above, in the present embodiment, it is possible to execute the printing using the decolorable toner only on the cover paper. For this reason, it is possible to erase an image printed on the cover paper used for sorting a plurality of documents or on the cover paper which is unnecessary. Therefore, it is possible to effectively reuse the unnecessary cover paper.

In the present embodiment, the case in which the image forming apparatus 1 is the laser printer is described. However, the present invention is not limited to that. The image forming apparatus 1 may be a multifunction peripheral or a FAX machine.

(Second Embodiment)

Figure 6:
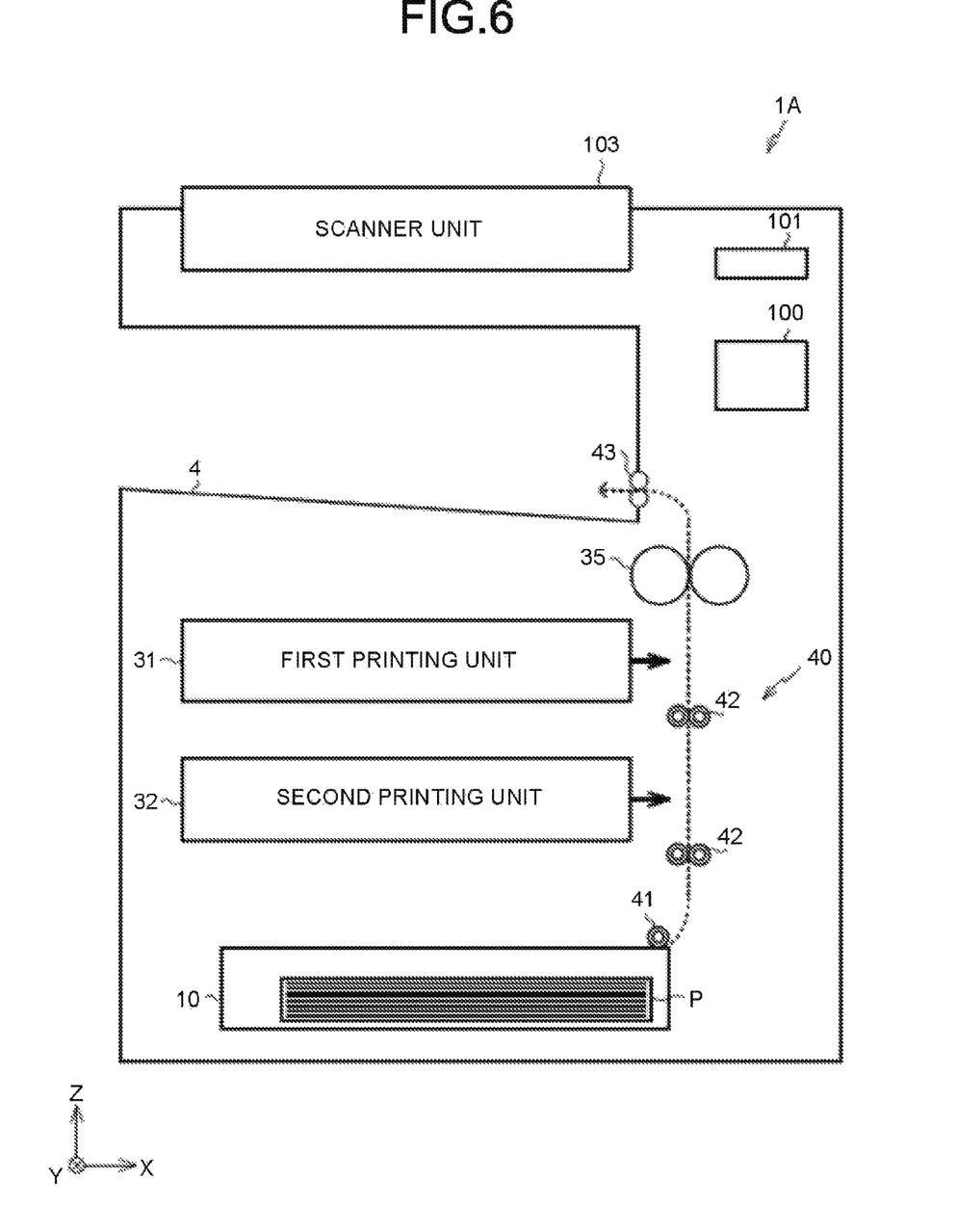
FIG. 6 is a diagram exemplifying the constitution of an image forming apparatus according to a second embodiment.

Next, the second embodiment is described with reference to the accompanying drawings. For the same or equivalent components as those in the first embodiment, the same reference numerals are donated thereto, and the description thereof is omitted or simplified. FIG. 6 is a diagram exemplifying the constitution of an image forming apparatus 1A according to the present embodiment. The image forming apparatus 1A is different from the image forming apparatus 1 according to the first embodiment in that the image forming apparatus 1A has a scanner unit 103 used for copying of the original document.

Figure 7:
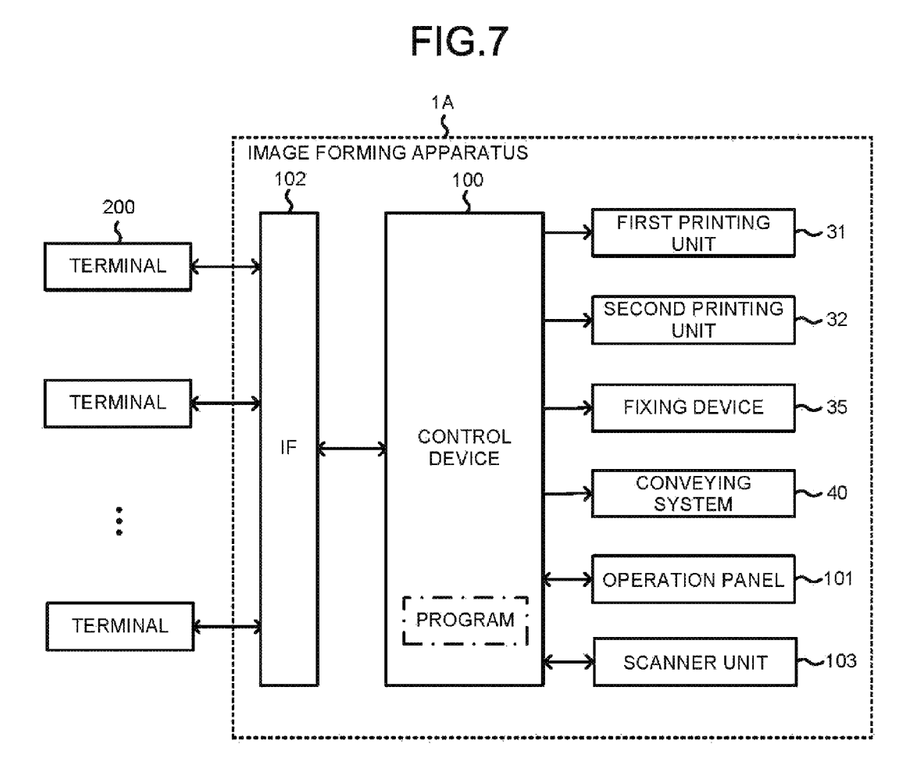
FIG. 7 is a block diagram illustrating a control system of the image forming apparatus.

The scanner unit 103 includes a scanner that scans an original document to generate image information and a feeder that feeds the original documents one by one to the scanner if a plurality of original documents is set. As shown in FIG. 7, the scanner unit 103 is connected to the control device 100. The scanner unit 103 transmits the image information generated by scanning the original document to the control device 100.

Figure 8:
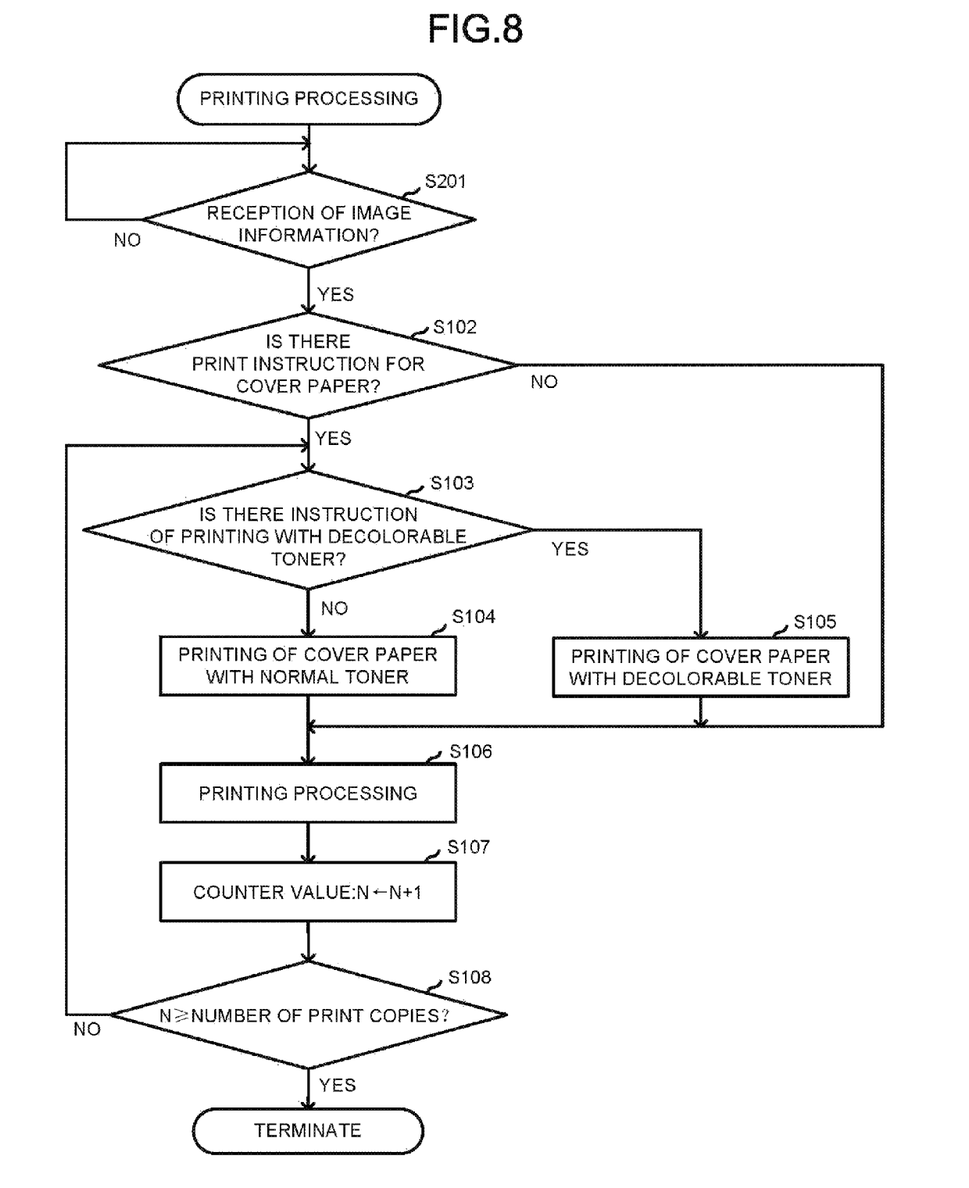
FIG. 8 is a flowchart illustrating a series of processing executed by a control device.

The operation of the image forming apparatus 1A is described with reference to FIG. 8. The flowchart in FIG. 8 shows a series of processing executed by the control device 100. If the power source of the image forming apparatus 1A is turned on, the control device 100 sequentially executes the processing shown in the flowchart in accordance with a preinstalled program.

First, the control device 100 waits for reception of the image information (Act S201). If the image information transmitted from the scanner unit 103 is received (Yes in Act S201), the control device 100 determines whether or not there is the print instruction for the cover paper (Act S102).

Figure 9:
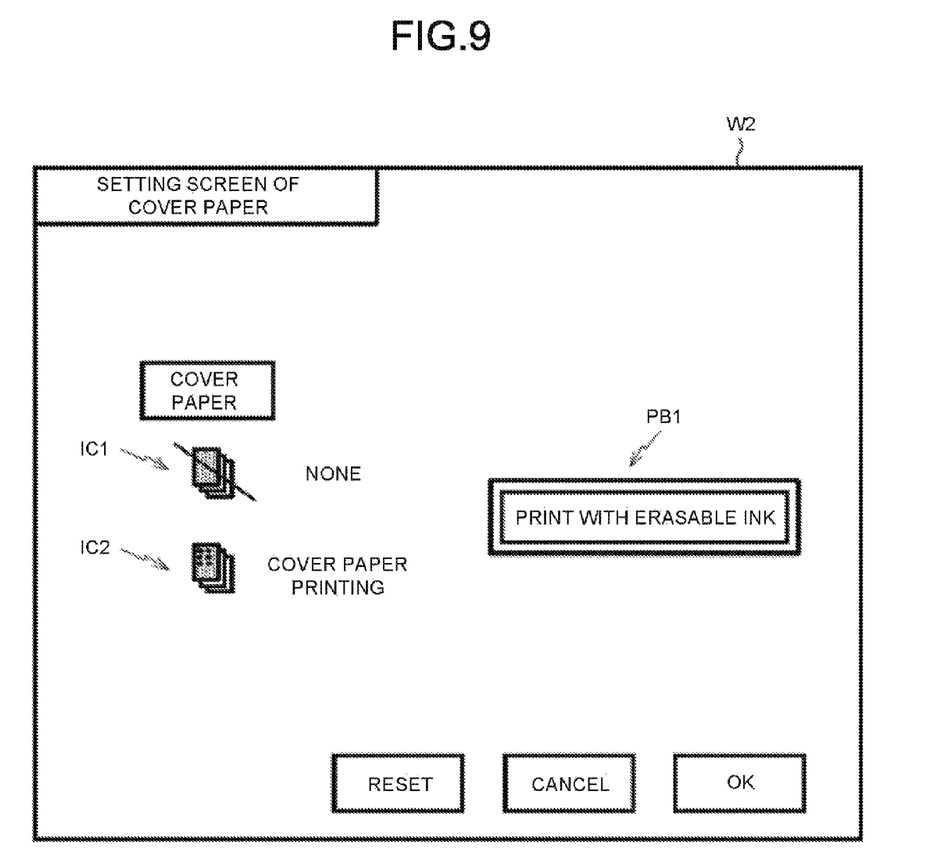
FIG. 9 is a diagram illustrating a window displayed on an operation panel as an example.

The print instruction of the cover paper from the user is input via the operation panel 101. FIG. 9 is a diagram illustrating a window W2 displayed on the operation panel 101 as an example. The window W2 shown in FIG. 9 is an input screen for setting the cover paper added to the printed matter. The window W2 includes icons IC1 and IC2 for setting whether to add the cover paper (cover letter) to the printed matter, and a button PB1 for setting the toner for printing the cover paper.

By touching the icon IC2 or the text thereof, the user can instruct the control device 100 to add the cover paper to the printed matter. By touching the icon IC1 or the text thereof, the user can instruct the control device 100 not to add the cover paper to the printed matter. The state of the button PB1 is switched from an active state to an inactive state or from the inactive state to the active state every time the button PB1 is touched. By touching the button PB1, the user can select the type of toner used for printing the cover paper. At the time the button P1 is active, the printing using the decolorable toner is instructed to the control device 100. At the time the button P1 is inactive, the printing using the non-decolorable toner is instructed to the control device 100.

If it is determined that there is no print instruction for the cover paper (No in Act S102) based on the instruction of the user input to the operation panel 101, the control device 100 executes the printing based on the image information with the non-decolorable toner without printing the cover paper (Act S106).

On the other hand, if it is determined that there is the print instruction for the cover paper (Yes in Act S102), the control device 100 determines whether or not there is the instruction of the printing with the decolorable toner (Act S103). If it is determined that there is no instruction of the printing with the decolorable toner (No in Act S103), the control device 100 prints the cover paper with the non-decolorable toner (Act S104). If it is determined that there is the instruction of the printing with the decolorable toner (Yes in Act S103), the control device 100 prints the cover paper with the decolorable toner (Act S105).

Following the printing of the cover paper, the control device 100 executes the printing based on the image information (Act S106). Thus, the printing of the printed matter to which the cover paper is added is completed.

The control device 100 adds 1 to the counter value N of the counter built in the control device 100 (Act S107). Then, the instructed number of the printed matters is compared with the counter value N (Act S108). The number of print copies is set through the operation panel 101. If it is determined that the counter value N is equal to or greater than the number of print copies (Yes in Act S108), the control device 100 initializes the counter value N and ends the printing processing. Thus, the copying of the original document is completed.

If it is determined that the counter value N is not equal to or greater than the number of print copies (No in Act S108), the processing in Act S103~Act S108 is repeatedly executed. Thus, only a designated number of the printed matters to which the cover papers are added are printed.

As described above, in the present embodiment, it is possible to execute the printing using the decolorable toner only on the cover paper. Thus, for example, it is possible to erase an image printed on the cover paper used for sorting a plurality of documents or on the cover paper which is unnecessary. Therefore, it is possible to effectively reuse the unnecessary cover paper.

Although the embodiments of the present invention are described above, the present invention is not limited by the above embodiments. For example, in the above-described embodiment, as shown in FIG. 5, a case in which the printing is executed only on one side of the paper P serving as the cover paper is described, but a paper P to which duplex printing is executed may be used as the cover paper.

Figure 10:
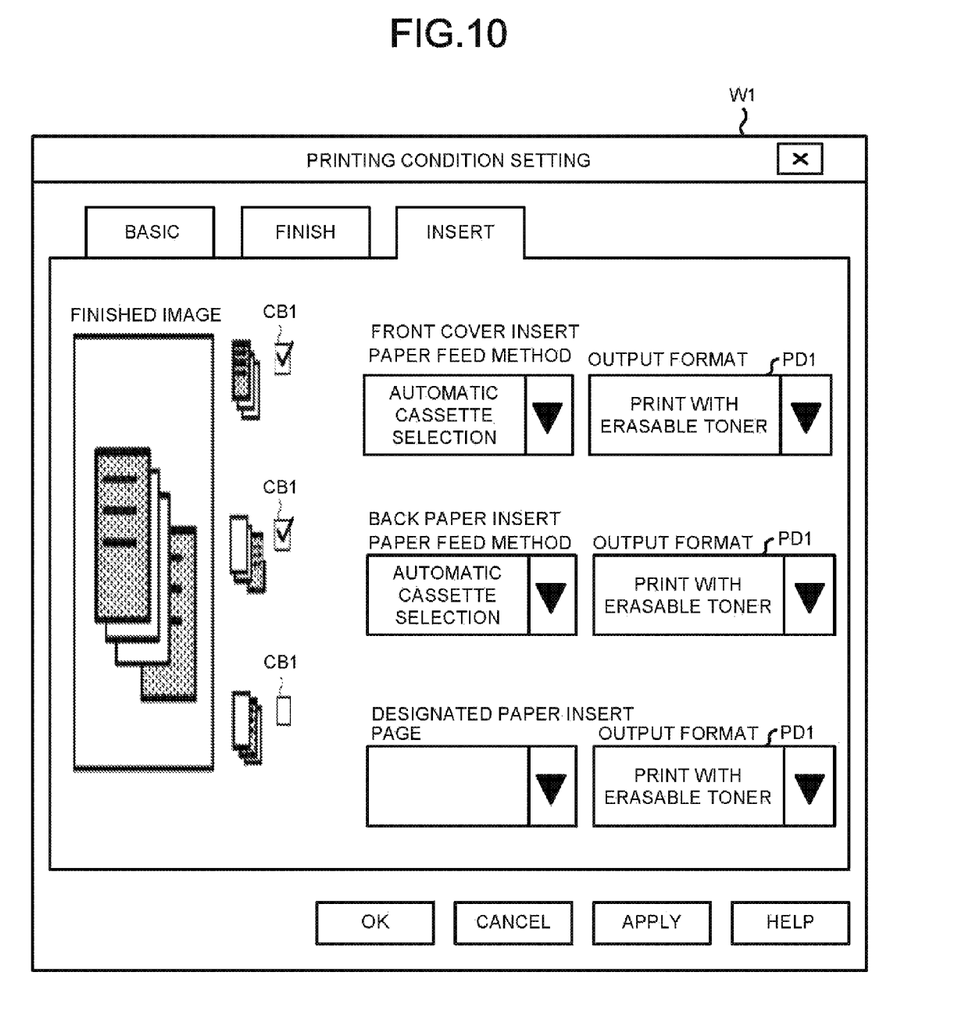
FIG. 10 is a diagram illustrating an interface for setting printing of a front cover and a back cover.
Figure 11:
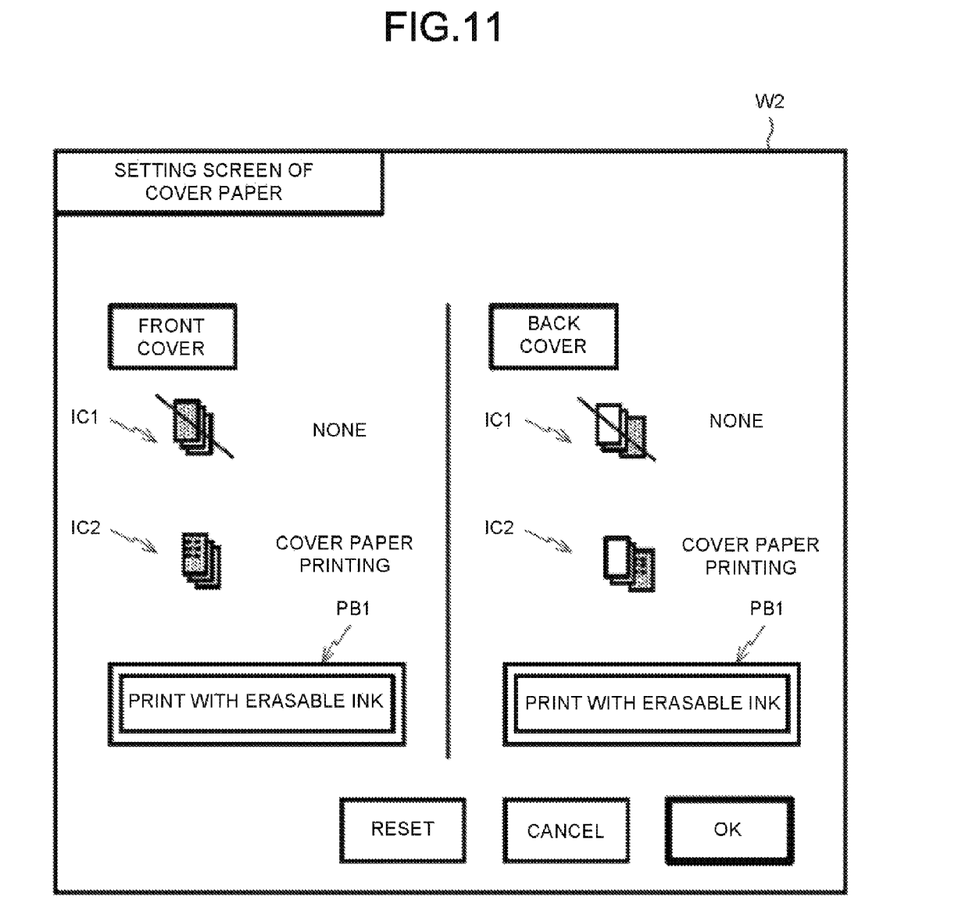
FIG. 11 is a diagram illustrating an interface for setting the printing of the front cover and the back cover.

In the above embodiment, a case in which the front cover is added to the printed matter is described. The present invention is not limited to this, and a back cover may be added to the printed matter. In this case, the above modification is realized as long as an execution order of the processing in Act S106 and the processing in Act S105 in FIG. 3 and FIG. 8 is changed. The cover paper maybe inserted into the printed matter for each predetermined page. In this case, the above modification is realized as long as processing in Act S105 is interruptedly executed in the processing in Act S106. In this case, as shown in FIG. 10 and FIG. 11, icons, buttons, check boxes, pull-down menus and the like for setting the printing of the front cover and the back cover are displayed on the windows W1 and W2.

In the above embodiment, it is assumed that the image forming apparatus is the laser printer or the multifunction peripheral, but the present invention is not limited thereto. The image forming apparatus may have a function of sending and receiving FAX.

As the terminal 200 according to the above-described embodiments, a general computer, a smartphone, or a tablet can be used as long as it is a computer on which a program such as a driver can be installed.

Figure 12:
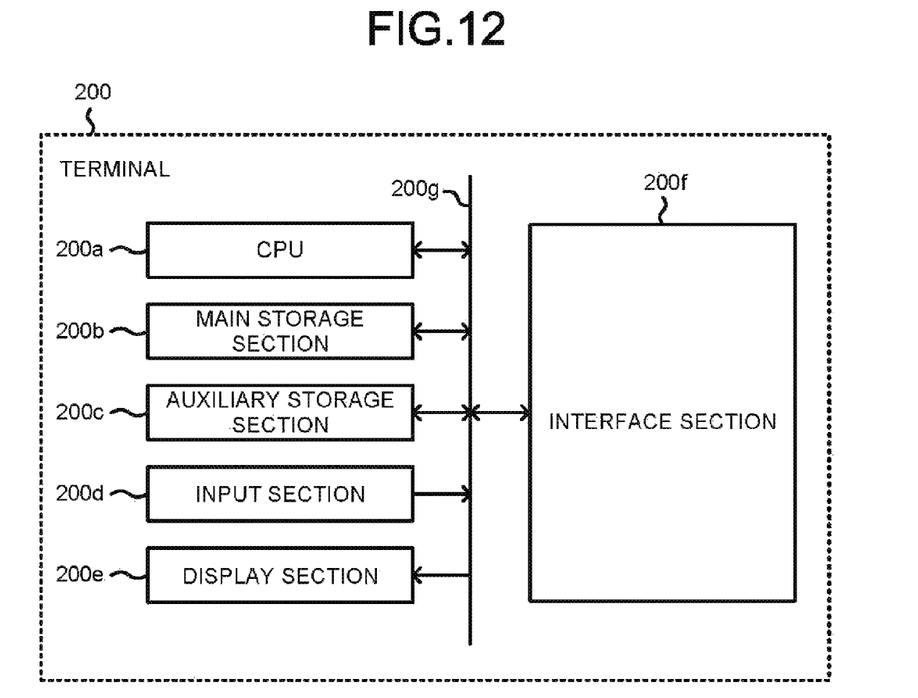
FIG. 12 is a block diagram of a terminal 200.

For example, FIG. 12 is a block diagram of the terminal 200. As shown in FIG. 12, the terminal 200 includes a CPU (Central Processing Unit) 200a, a main storage section 200b, an auxiliary storage section 200c, an input section 200d, a display section 200e, an interface section 200f and a system bus line 200g.

The CPU 200a reads out a program stored in the auxiliary storage section 200c to execute it.

The main storage section 200b has a volatile memory such as a RAM (Random Access Memory). The main storage section 200b is used as a working area of the CPU 200a.

The auxiliary storage section 200c has a nonvolatile memory such as a ROM (Read Only Memory), a magnetic disk, a semiconductor memory and the like. The auxiliary storage section 200c stores the programs executed by the CPU 200a and various parameters.

The input section 200d has a keyboard and a pointing device such as a mouse. The instruction of the user is input via the input section 200d and notified to the CPU 200a via the system bus line 200g.

The display section 200e has a display such as an LCD (Liquid Crystal Display). The display section 200e displays the window W1 as an input screen and information relating to the status of the image forming apparatus 1.

The interface section 200f includes a LAN interface, a serial interface, a parallel interface, an analog interface, and the like. The terminal 200 is connected to the image forming apparatus 1 via the interface section 200f.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
    a first printing unit configured to execute printing with non-decolorable first toner on a first image receiving medium;
    a second printing unit configured to execute printing with decolorable second toner on a second image receiving medium, and
    a control module configured to receive image data and a command for adding a cover to an image to be formed based on the image data, and to control so as to form the image according to image data on the first image receiving medium with the first printing unit, and execute printing the cover having a fixed form on the second image receiving medium with the second printing unit.

2. The image forming apparatus according to claim 1, further comprising:
    a display, wherein
    the control module displays an input screen for receiving an instruction from a user on the display.

3. The image forming apparatus according to claim 2, wherein
    the input screen includes options for selecting a front cover or a back cover as the cover paper.

4. The image forming apparatus according to claim 2, wherein
    the input screen includes options for selecting whether to print the cover paper with the second printing unit.

5. The image forming apparatus according to claim 3, wherein
    the input screen includes options for selecting whether to print the cover paper with the second printing unit.

6. A method for executing procedures for displaying an input screen to receive an instruction from a user, including:
    executing printing with non-decolorable first toner on a first image receiving medium;
    executing printing with decolorable second toner on a second image receiving medium, and
    printing received image data and adding a cover to an image to be formed based on the image data, and forming an image according to image data on the first image receiving medium with the first printing unit, and executing printing the cover having a fixed form on the second image receiving medium with the second printing unit.

* * * * *